Aug. 26, 1924.
W. B. NICHOLSON
COMBINATION AUTO JACK AND RIM TOOL
Filed March 25, 1922  2 Sheets-Sheet 1
1,506,603
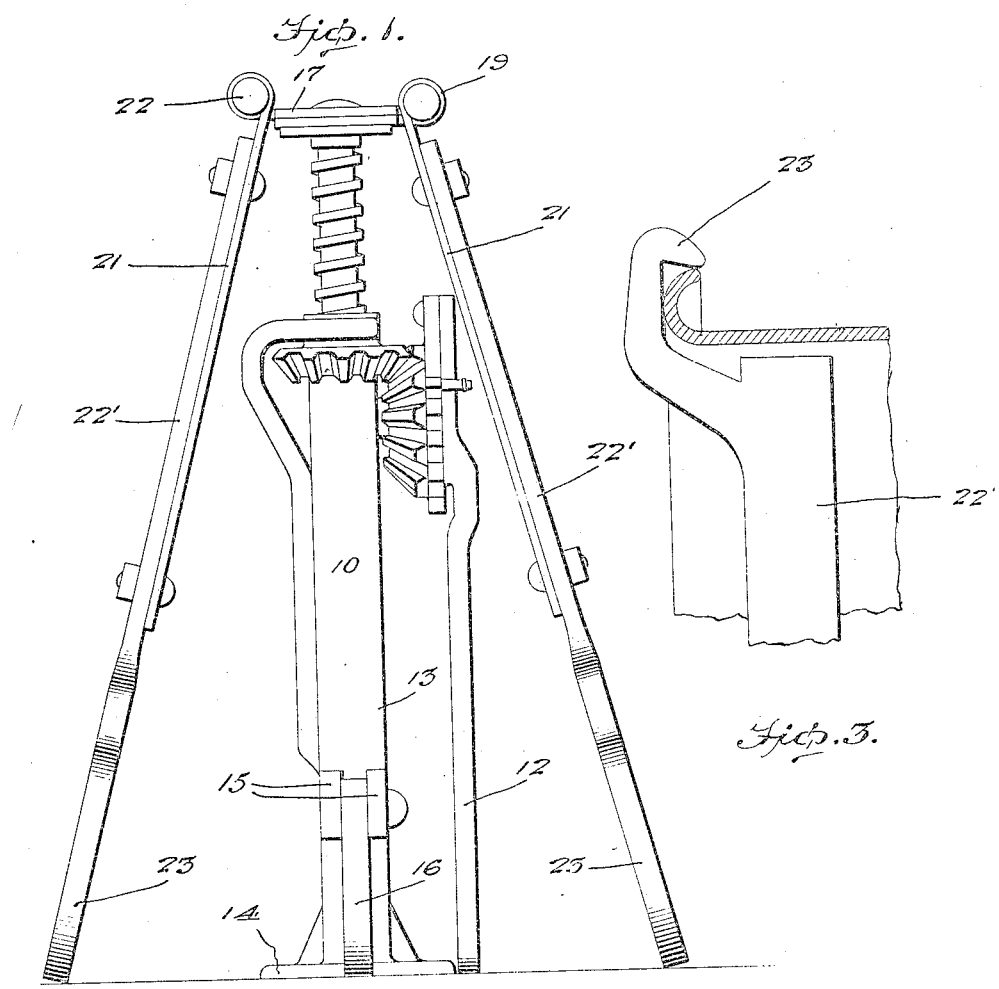
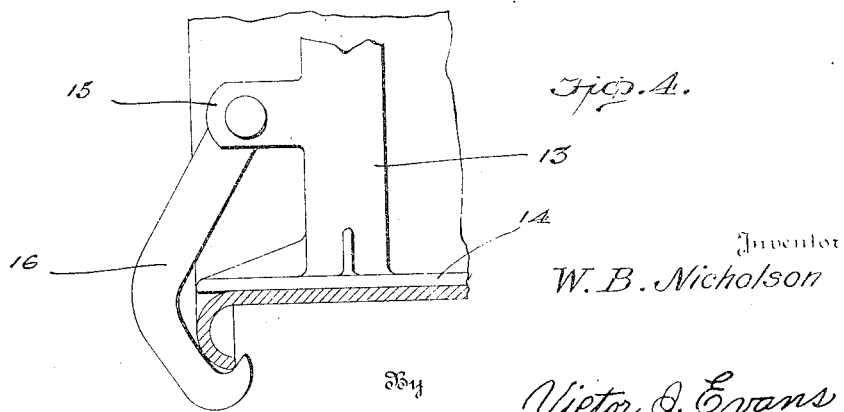
Inventor
W. B. Nicholson
By Victor J. Evans
Attorney Aug. 26, 1924.  
W. B. NICHOLSON  
COMBINATION AUTO JACK AND RIM TOOL  
Filed March 25, 1922  
1,506,603  
2 Sheets-Sheet 2

Inventor  
W. B. Nicholson

By Victor J. Evans  
Attorney

Patented Aug. 26, 1924.

1,506,603

UNITED STATES PATENT OFFICE.

WILLIAM B. NICHOLSON, OF CHAPMAN, KANSAS.

COMBINATION AUTO JACK AND RIM TOOL.

Application filed March 25, 1922. Serial No. 546,655.

*To all whom it may concern:*

Be it known that I, WILLIAM B. NICHOLSON, a citizen of the United States, residing at Chapman, in the county of Dickinson and State of Kansas, have invented new and useful Improvements in Combination Auto Jack and Rim Tools, of which the following is a specification.

This invention comprehends the provision of a combination jack and rim tool, which can be conveniently and advantageously used in either capacity, being particularly useful in contracting and expanding tire carrying rims to facilitate the removal of the tire therefrom or its association therewith.

The nature and advantages of the invention will be better understood when the following detailed description is read in connection with the accompanying drawings, the invention residing in the construction, combination, and arrangement of parts as claimed.

In the drawings formnig part of this application, like numerals of reference indicate similar parts in the several views, and wherein:—

Figure 1 is a view in elevation of the device forming the subject matter of the invention, showing the arrangement of parts when the device is used in the capacity of a jack.

Figure 3 is a sectional view taken on line 3—3 of Figure 2.

Figure 4 is a sectional view taken on line 4—4 of Figure 2.

Figure 2:
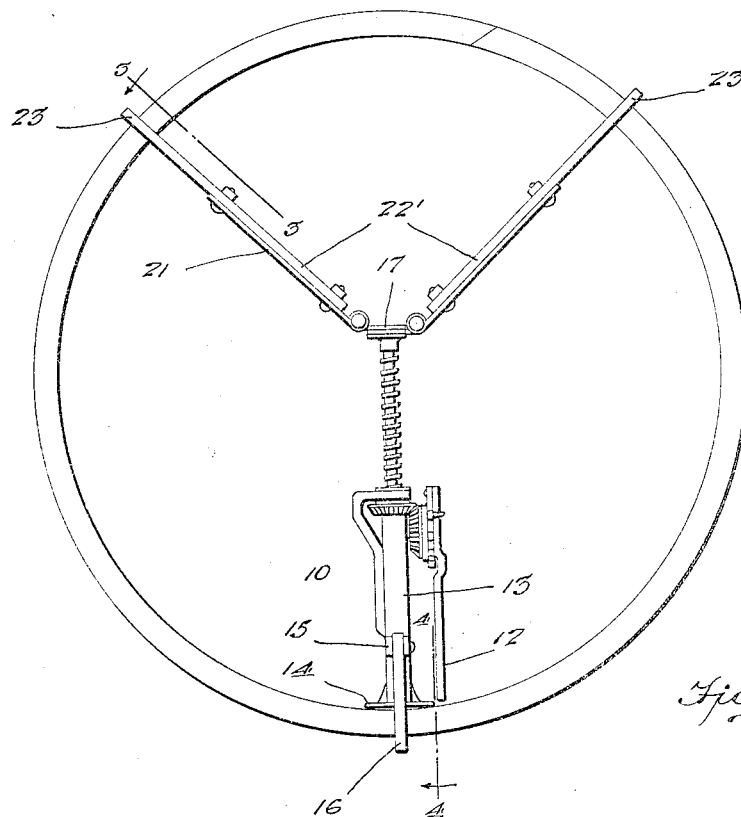
Figure 2 is a plan view of a tire carrying rim showing the manner of using the device in connection therewith.
Figure 5:
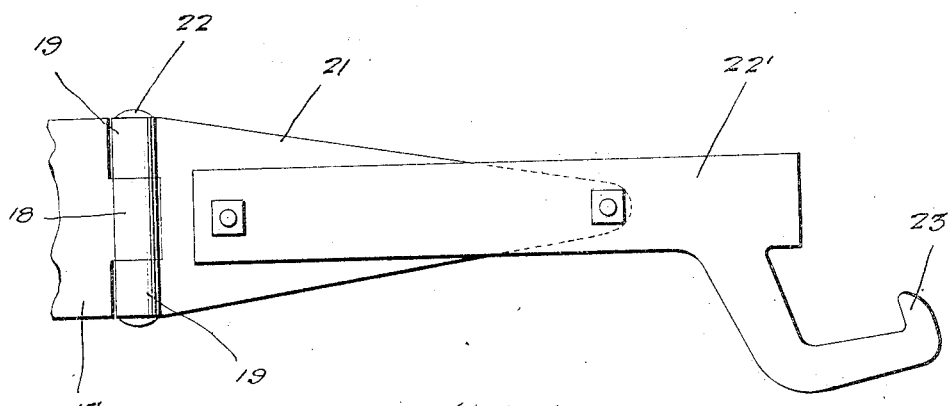
Figure 5 is a detail view of one of the swinging arms.

Referring to the drawings in detail, 10 indicates generally a screw jack of any well-known construction, and wherein the operating lever is indicated at 12. Projecting from the housing 13 adjacent the base 14 of the jack are spaced apertured lugs 15 between which is pivoted a hook-like element 16. The purpose of this element will be hereinafter set forth. Secured to the head of the screw is a plate 17, and arranged centrally of the opposed sides thereof are loops 18 received between similar loops 19 formed on the adjacent extremities of swinging members 21. Pintles 22 are passed through these loops to swingingly support the members 21.

Bolted or otherwise suitably secured to each member is an arm 22 which terminates to provide an offset hook-like terminal 23, and these members are used in connection with a tire carrying rim when it is desired to contract or expand the latter for the purpose above mentioned.

When the device is used as a jack, the arms can be swung at any desired angle with respect to the screw, so as to occupy an out of the way position, thereby allowing the head of the screw to be properly positioned beneath that part of the vehicle or object to be lifted.

When the device is used in connection with a tire carrying rim, the latter is laid upon the ground or surface and the device placed within the rim in the manner illustrated in Figure 2. The base of the jack contacts the rim at a point diametrically opposite the meeting ends of the rim, and the hook 15 is swung over one edge of the rim to assist in holding the device immovably associated with the rim, or otherwise avoid slipping of the device. The arms are then swung to any desired angle with relation to the screw, and the hook-like terminals of said arms arranged to engage the edge of the rim, appropriate distances from the meeting ends thereof. When associated with the rim in this manner, the bar 25 is properly arranged, depending of course upon whether it is desired to contract or expand the rim. When the screw moves within its housing, a pull is exerted upon the rim adjacent the meeting ends thereof in a manner to separate said ends and allow the rim to contract by reason of its inherent qualities. On the other hand, when the screw is forced outwardly of its housing, the rim is expanded to return the meeting ends to their original position in face to face contact.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A combination jack and rim tool comprising a base, a hollow standard rising therefrom, a screw operating in said standard, means for operating said screw, a plate carried by the upper end of the screw, swinging members hingedly connected upon the opposite sides of said plate, a relatively long arm carried by each member and arranged parallel therewith, a hook like portion projecting laterally from the outermost end of each arm and adapted to engage said rim, spaced parallel lugs projecting from said jack standard at a point adjacent the base, a pivoted hook like member mounted between said lugs and arranged to engage the rim at a point immediately beneath said base as and for the purpose specified, the arms being adapted to be swung downwardly upon opposite sides of the base and engaged with the ground to serve as balancing legs for the device when used as a jack.

In testimony whereof I affix my signature.

WILLIAM B. NICHOLSON.